United States Patent [19]

Anthony et al.

[11] 4,298,434
[45] Nov. 3, 1981

[54] BOTTOM MOUNTED FUEL HOLDDOWN MECHANISM

[75] Inventors: Andrew J. Anthony, Tariffville, Conn.; Malcolm D. Groves, Clearwater, Fla.

[73] Assignee: Combustion Engineering, Inc., Windsor, Conn.

[21] Appl. No.: 959,971

[22] Filed: Nov. 13, 1978

[51] Int. Cl.³ .............................................. G21C 3/02
[52] U.S. Cl. ................................................ 376/364
[58] Field of Search ....................... 176/50, 61, 87, 78

[56] References Cited

U.S. PATENT DOCUMENTS

| | | | |
|---|---|---|---|
| 3,057,793 | 10/1962 | Coates et al. | 176/50 |
| 3,389,056 | 6/1968 | Frisch | 176/78 |
| 3,549,491 | 12/1970 | Johnson . | |
| 3,853,703 | 12/1974 | Anthony et al. | 176/50 X |
| 4,038,133 | 7/1977 | Bittermann et al. | 176/78 X |
| 4,045,287 | 8/1977 | van Santen | 176/78 |
| 4,053,358 | 10/1977 | Pennell | 176/61 X |
| 4,053,359 | 10/1977 | Pennell et al. | 176/61 |
| 4,134,790 | 1/1979 | Bevilacqua et al. | |

*Primary Examiner*—Peter A. Nelson
*Attorney, Agent, or Firm*—L. James Ristas

[57] ABSTRACT

A fuel assembly having a lower end fitting and actuating means interacting therewith for holding the assembly down on the core support stand against the upward flow of coolant. Locking means for interacting with projections on the support stand are carried by the lower end fitting and are actuated by the movement of an actuating rod operated from above the top of the assembly. In one embodiment of the invention the downward movement of the actuating rod forces a latched spring to move outward into locking engagement with a shoulder on the support stand projections. In another embodiment, the actuating rod is rotated to effect the locking between the end fitting and the projection.

9 Claims, 11 Drawing Figures

BOTTOM MOUNTED FUEL HOLDDOWN MECHANISM

BACKGROUND OF THE INVENTION

The present invention relates to nuclear reactor fuel assemblies, and in particular to apparatus for holding a fuel assembly down against a core support stand.

It is known that the coolant flow rate in modern nuclear reactors can be so large that the weight of the fuel assembly is insufficient to prevent the assembly from being lifted off the core support stand. One solution is to place coil springs at the top of the assembly and use the fuel upper alignment plate to compress the springs and bias the assembly down against the support stand. Although this arrangement is effective in holding down the assembly, the downward biasing force places a compressive load on the fuel assembly skeleton, i.e. the control rod guide tubes, and is believed to contribute to bowing of the fuel assembly. Assembly bowing can lead to undesirable consequences which prudent designers wish to avoid.

Another prior art arrangement locates the holddown mechanism in the assembly lower end fitting. In one such arrangement the lower end fitting has four alignment posts adapted to be located adjacent to four respective alignment pins projecting from the core support stand. Springs connected to the end fitting extend through two proximate posts and are adapted to engage shoulders on the projections. The spring locking surface is oriented to provide vertical holddown of the assembly and to provide horizontal bracing to preclude lateral vibration. The weight of the assembly provides the locking force but large external lifting forces are required to overcome the locking forces in order for the assembly to be removed from the stand. This prior art arrangement was deficient in one major respect. The spring force required to provide sufficient holddown and horizontal bracing was so large that it caused premature deterioration on the shoulders of the support stand projection during fuel assembly disengagement operations. It is preferable that, if one of the locking members is to wear, it should be the member connected to the fuel assembly, since the assembly life is typically 3 or 4 years, whereas the lifetime of the support stand projection is expected to be over 40 years.

SUMMARY OF THE INVENTION

It is an object of the invention to provide a fuel assembly having a simple apparatus for locking the assembly down onto a core support stand such that the locking can be selectively controlled from the upper end of the assembly.

It is another object to effect the locking and unlocking without producing excessive wear on any of the support stand structure.

It is a further object to provide such locking means as can be remotely unlocked in the event of failure of a locking component.

According to the invention, the assembly has a lower end fitting resting on the support stand, actuating means extending from the upper end of the fuel assembly through the lower end fitting, and locking means responsive to the movement of the actuating means for selectively interacting with the projections. In the preferred embodiment of the invention, the actuating means comprises a rod disposed along the vertical axis of the fuel assembly and extending into the lower end fitting, where laterally extending actuating arms are attached to the rod. The lower end fitting forms alignment posts to be located adjacent alignment pins in the support stand. Two of the posts are fitted with locking springs which are adapted to engage shoulder means in the pins. The other posts are fitted with bracing springs that do not engage the adjacent pins. During placement of the assembly onto the stand, the actuating rod is in an upmost position so that the arms are above the locking and bracing springs. To lock the assembly into place, the rod is forced downward whereby the arms contact the surfaces of the springs. It is contemplated that the core upper alignment plate will provide this holddown force. The locking springs, having a low spring constant, are forced outward into engagement with the adjacent pin shoulder. The bracing springs, having a high spring constant, produce horizontal movement of the posts into firm contact against the adjacent pins. The combined effect is that one set of springs provides positive locking holddown and other set provides lateral bracing against vibration. The apparatus automatically unlocks when the core upper alignment plate is lifted and a slight upward force is applied to the actuating rod. In the event that, for example, the actuating rod is broken, apertures in the end fitting provide access for remote handling tools to disengage the spring so that the assembly may be removed.

BRIEF DESCRIPTION OF THE DRAWINGS

Other objects and advantages of the invention will be evident from the description accompanying the drawings in which.

DESCRIPTION OF THE PREFERRED EMBODIMENTS

Figure 1:
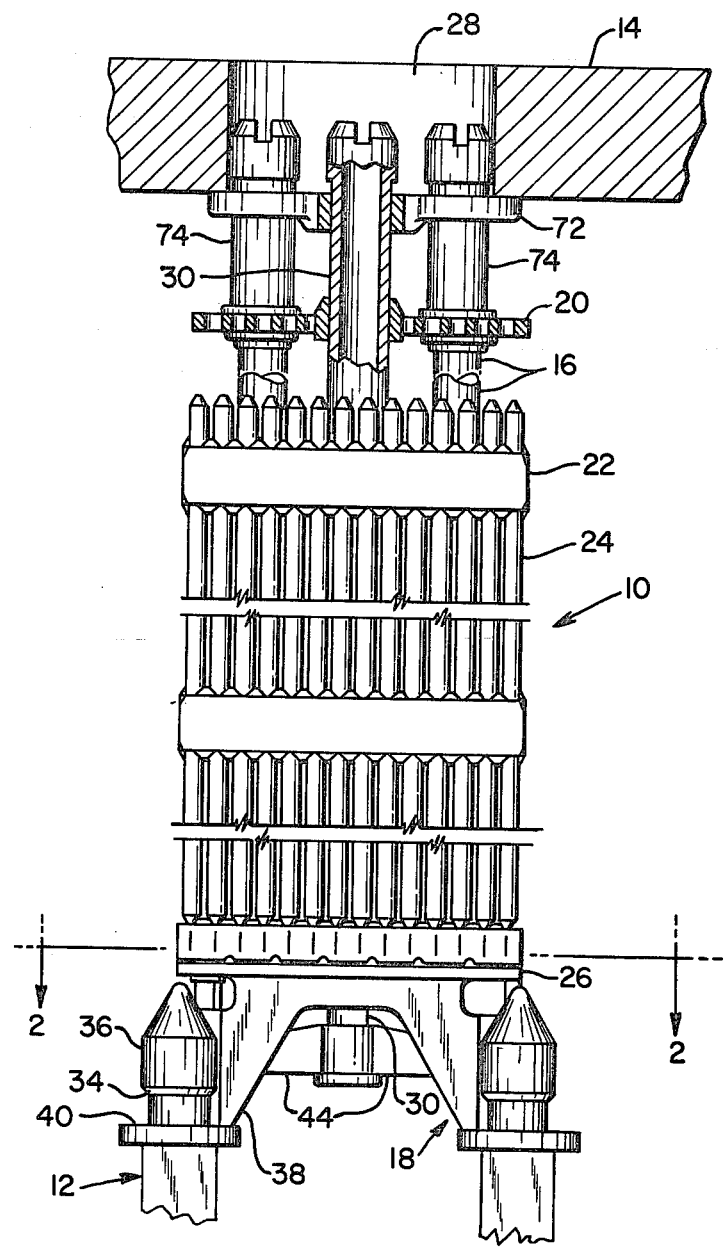
FIG. 1 is an elevation view of a nuclear fuel assembly showing the preferred embodiment of the invention.

FIG. 1 shows a nuclear fuel assembly 10 located on a core support stand 12 and aligned at the top in the core upper alignment plate 14. The skeleton of the fuel assembly includes a plurality of control rod guide tubes 16 fixedly connected to the lower end fitting 18 and the perforated upper end plate 20. Spacer grids 22 are welded to the guide tubes 16 and provide a support matrix for retaining a plurality of fuel rods 24. During operation of the reactor, a coolant is pumped upward from below the support stand 12, up through perforations in the lower end plate 26, over the fuel rods 24, through the upper end plate 20 and out the upper alignment plate 14 through opening 28. The present invention provides an apparatus for holding the fuel assembly 10 down against the core support stand 12 to prevent the upward flow of the coolant from lifting the assembly off the stand. In the preferred embodiment of the invention, the fuel assembly 10 includes an actuating rod 30 movable with respect to the upper end plate 20 and the lower end fitting 18. The actuating rod 30 operates locking means 32 (FIG. 2) carried by the lower end fitting 18 whereby the assembly is locked to the shoulders 34 on the fuel alignment pins 36 formed as projections on the core support stand 12.

Figure 2:
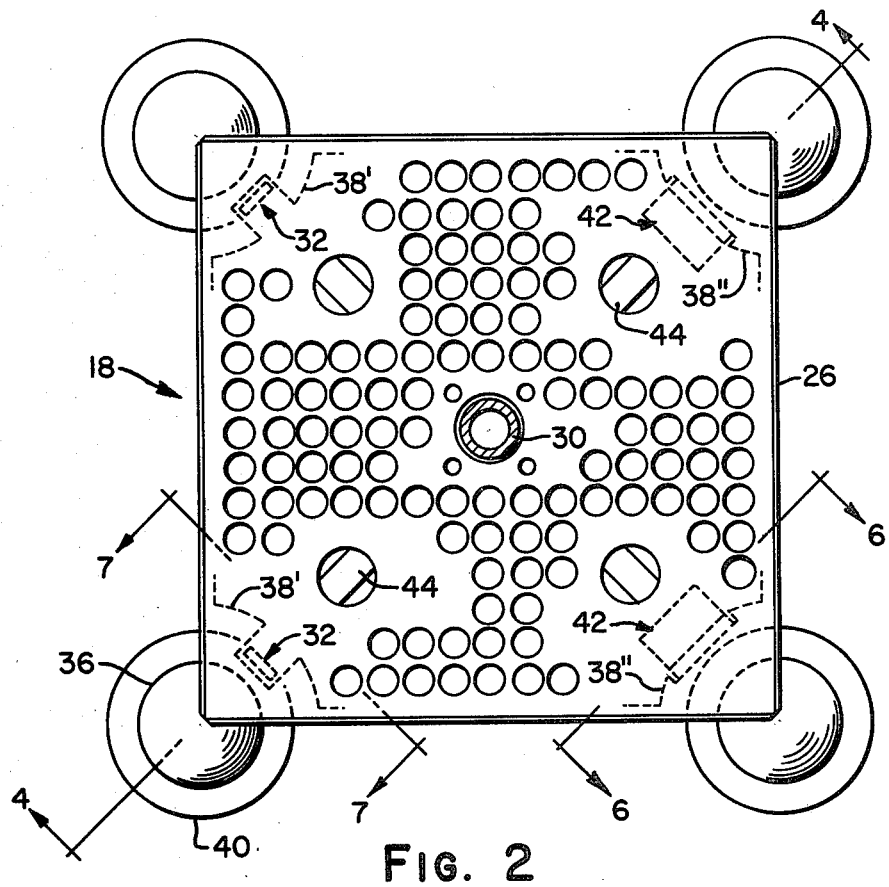
FIG. 2 is a section view along the lines 2—2 of FIG. 1, with the control rod guide tubes omitted.

FIG. 2 shows the upper surface of the lower end plate 26 and FIGS. 1 and 2 show the relation of the lower end fitting 18 to the alignment pins 36. The posts 38 of the lower end fitting 18 rest on the base portion 40 of the pins 36. The locking means 32, shown in phantom in FIG. 2, are associated with the two posts 38' in the left side of FIG. 2, and the bracing means 42 are associated with the right most posts 38" in FIG. 2. The locking means 32 and bracing means 42 are activated by actuating arms 44, which are operated by actuating rod 30 disposed in the center of the end fitting 18 and movable with respect thereto.

Figure 3:
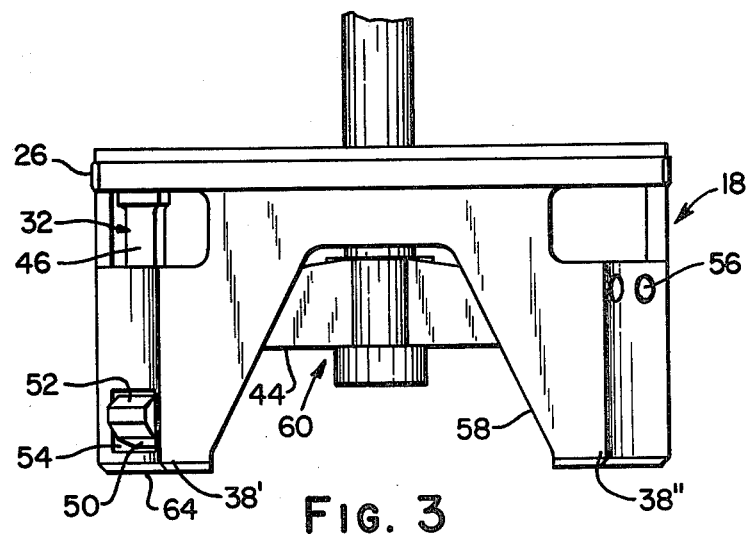
FIG. 3 is an enlarged view of the lower end fitting shown in FIG. 1 with the support stand alignment pins removed to show details of the post.
Figure 4:
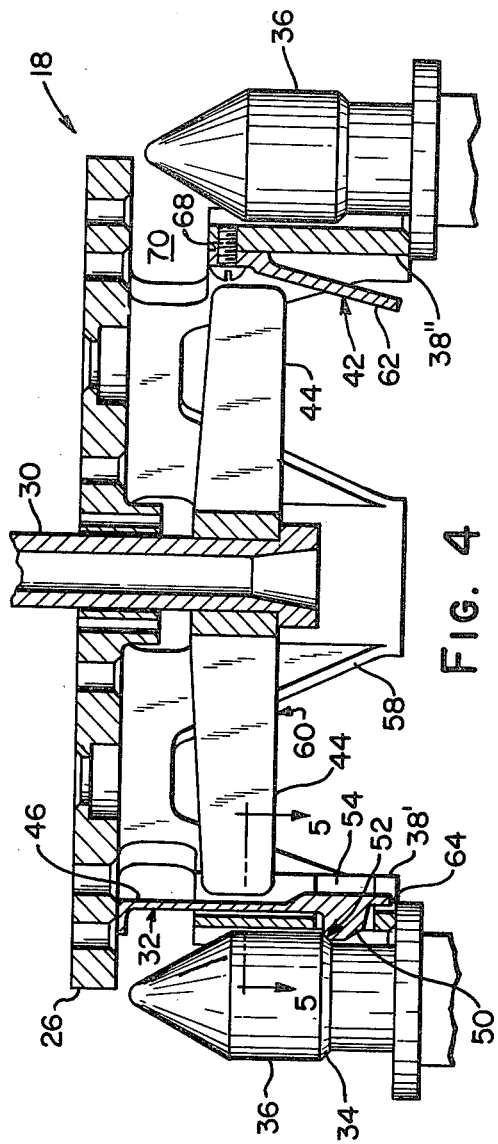
FIG. 4 is a section view along the lines 4—4 of FIG. 2.

As shown in FIGS. 3 and 4, the locking means 32 includes a cantilever spring 46 attached to the lower end plate 26 and having a shank portion extending downward behind the post 38'. The latch portion 50 of the locking spring 46 has an external side formed into a cam 52 which is laterally movable through the opening 54 in the post 38'. The other post 38" includes taps 56 thereon for use in connecting the bracing means 42 to the inside of the post. The four posts 38', 38" are extensions of a frame 58 fixedly connected to the lower end plate 26 and forming the lower portion of the end fitting 18.

Referring more specifically to FIG. 4, the locking action of the invention is more clearly shown. The actuating assembly 60 includes the actuating rod 30 and a plurality of actuating arms 44 extending laterally therefrom below the lower end plate 26. When in the upmost position the actuating assembly 60 does not provide any locking force on the locking spring 46 and the bracing spring 62. As the actuating assembly 60 is forced downward, the exterior ends of the arms simultaneously contact the locking spring 46 and the bracing spring 62 whereby a continued downward force causes the latch 50 to move outward into engagement with the shoulder 34 on the alignment pin 36. The bracing spring 62 is designed to have a much higher stiffness than the locking spring 46 so that the bracing spring 62 is deflected only slightly. However, the downward force on the bracing spring has a horizontal component which forces the lower end fitting 18 and the entire fuel assembly to move slightly to the right until the exterior surface of the post 38" firmly contacts the adjacent alignment pin 36'. At a predetermined elevation of the arms 44 relative to the post sole 64, the cam 52 is firmly locked to the shoulder 34 and the lower end fitting 18 is in firm contact with the alignment pins 36.

Thus, the holddown against the coolant lift force is provided by two latches 50, and the resistance to horizontal vibration is provided by the action of the two bracing springs 62. In a typical modern nuclear reactor, it has been found that for a fuel assembly weighing (dry) about 1500 pounds, a suitable latch spring 46 can be made from stainless steel about 100 mils in thickness so that the spring stiffness at the cam of the latch is about 10 pounds per inch. A suitable bracing spring 62 is made from Inconel 718 having a thickness of about 0.150 inches and a spring rate at the point of initial arm contact of about 4500 pounds per inch.

Figure 5:
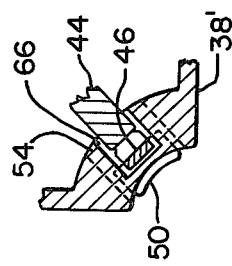
FIG. 5 is a section view of a post having the locking spring, taken along the lines 5—5 of FIG. 4.

FIG. 5 shows in detail the relationship of the locking spring 46 to the post 38'. The external side of the latch 50 protrudes through the opening 54 in the lower portion of the post 38', and the internal side of the spring 46 extends upward within a notch 66 formed on the internal side of the post 38'. The notch 66 is preferably long enough to capture the actuating arm 44 so that the arm is always in proper position for actuating the latch 50. As the arm 44 is moved downward transversely relative to the plane of the figure, an outward force is applied to the latch 50.

Figure 7:
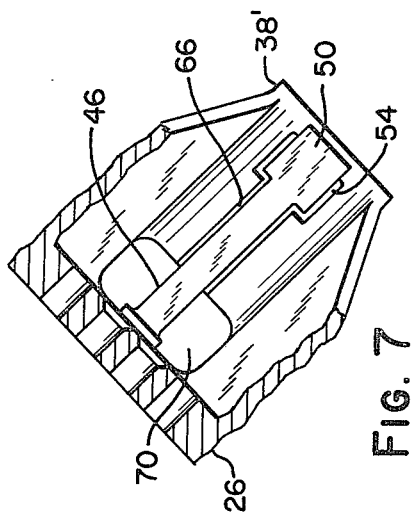
FIG. 7 is a detailed elevation view of the internal side of a post having the locking spring, taken along the lines 7—7 of FIG. 2.
Figure 6:
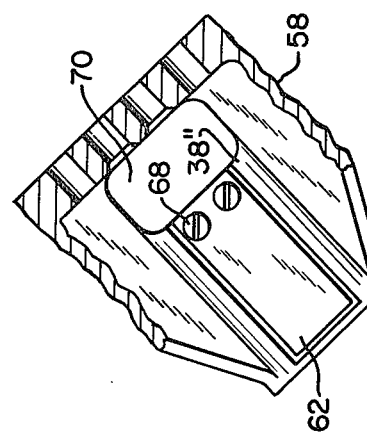
FIG. 6 is a detailed elevation view of the internal side of a post having the bracing spring, taken along the lines 6—6 of FIG. 2.

Details of the inner portion of the post 38" having the bracing spring 62 are shown in FIG. 6. Two taps 56 (see FIG. 3) are located in the corner of the post 38" for engaging the mounting bolts 68. The post 38" is rigidly connected to the frame 58, the area above the post remaining open to form an aperture 70 through which access can be had to structures interior to the end fitting. In FIG. 7, the locking spring 46 is shown depending from the end plate 26. The locking post 38' has an opening 54 in the lower portion through which the latch 50 is movable, and an aperture 70 above the post for permitting access to the interior of the end fitting to disengage the latch 50 in the event of component failure. A notch 66 is formed along the interior of the post 38' for capturing and guiding the vertical motion of the actuating arm 44' (not shown).

Referring again to FIGS. 1 and 4, it is seen that the upper end of the actuating rod 30 is fixedly connected to the holddown plate 72. The guide tube extensions 74 are fixedly connected to the upper ends of the guide tubes 16. The holddown plate 72 is movable relative to the extensions 74. During reactor refueling, the upper alignment plate 14 is removed from the reactor core so that a relatively small upward force on the actuating rod 30 will cause the actuating arms 44 to rise above and out of contact with the springs 46, 62. Thus the fuel assembly is unlocked and may be removed from the core support stand 12 without high frictional forces being exerted on the shoulders 34 of the alignment pins 36. After a new or relocated assembly 10 is placed on the core support stand 12 and properly oriented on the base 40 of alignment pins 36, the upper alignment plate 14 is placed over all assemblies simultaneously and clamped down by the reactor vessel closure head (not shown). As the upper alignment plate 14 is clamped down, it exerts a downward force on each holddown plate 72 whereby the actuating rods 30 on all assemblies are forced downward to effectuate the locking and bracing action at the lower end fitting 18.

Figure 8:
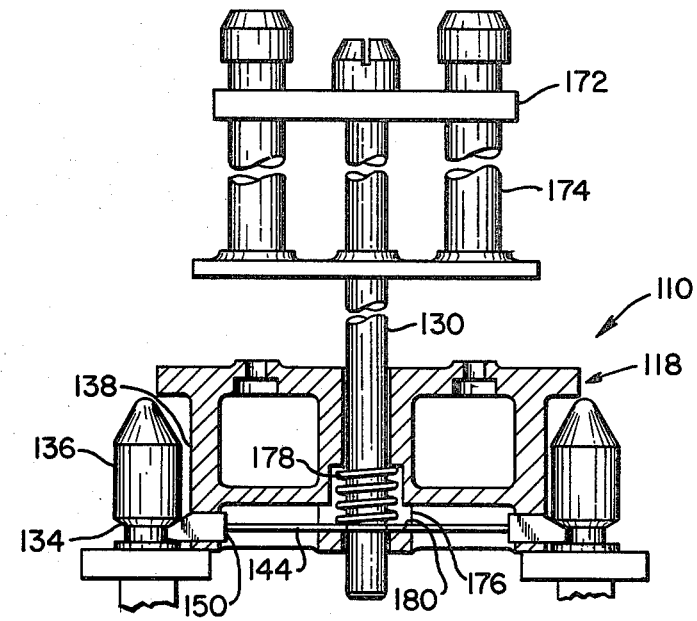
FIG. 8 is an elevation view of the skeleton of a fuel assembly (without outer guide tubes) showing an alternate embodiment of the invention in the locked position.
Figure 9:
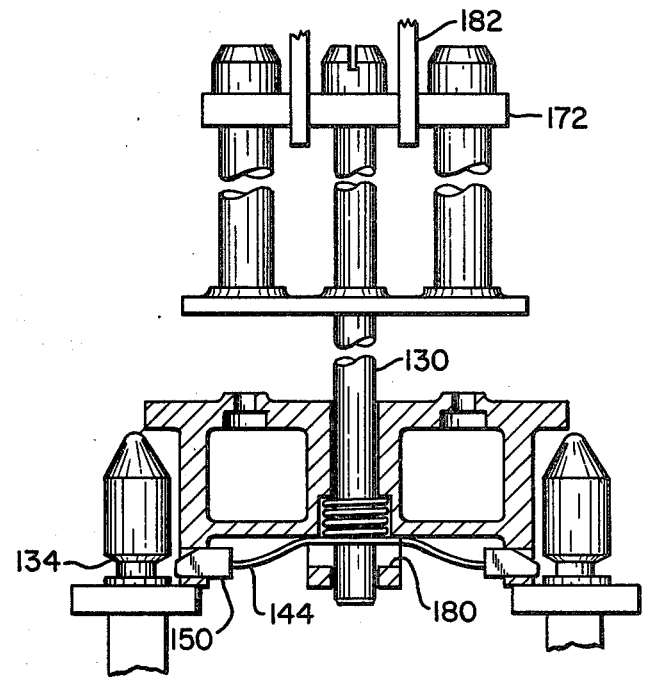
FIG. 9 is a view similar to FIG. 8 with the invention in the unlocked position.

FIGS. 8 and 9 show a different embodiment of the invention wherein a flexible stainless steel actuating arm 144 is fixedly connected to the actuating rod 130 and fixedly connected to the latch 150. FIG. 8 shows the assembly 110 in the locked position with the actuating arm 144 substantially horizontal and the latch 150 engaged with the shoulders 134 of the alignment pin 136. Although only two arms 144 are shown, it is understood that preferably four individual arms extend outward from the actuator housing 176, each along a diagonal from the center of the end fitting 118 to a post 138. A holding spring 178 is interposed between the actuator housing 176 and the inner portion of the arms 144, the holding spring 178 being in compression even in the extended position shown in FIG. 8 in order to provide a downward bias on the actuating arm 144 against the arm stop 180 whereby the latch 150 is maintained in the fully extended horizontal position during normal operation.

FIG. 9 shows the actuating rod 130 in the uppermost, or unlocked, position. The latch 150 has been pulled away from the shoulders 134 by the upward movement of the actuating rod 130 caused by the force of the refueling machine grapple 182 on the fuel assembly holddown plate 172. In this embodiment of the invention, the upper alignment plate 14 shown in FIG. 1 does not supply the actuating force. Instead, the grapple 182 is used while the plate 14 is out of the reactor vessel. As described in the previous embodiment, the holddown plate 172 is fixed to the actuating rod 130 but is movable with respect to the guide tube extensions 174.

Figures 10, 11:
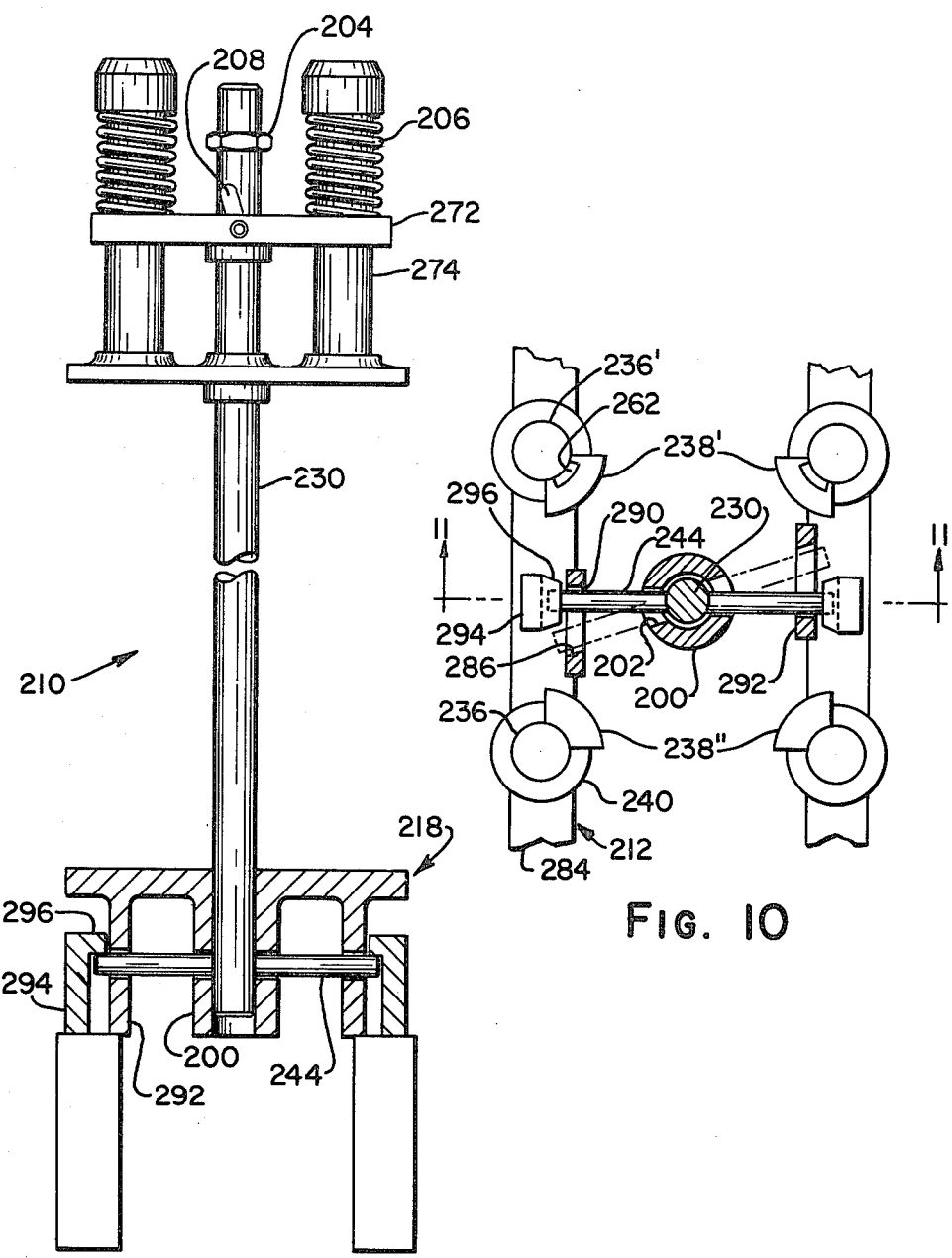
FIG. 10 is a plan view of the lower portion of the end fitting showing a third embodiment of the invention.
FIG. 11 is an elevation view in section along the lines 11—11 of FIG. 10.

A third embodiment of the invention, shown in FIGS. 10 and 11, is actuated by a rotational motion of the actuating rod 230 rather than the vertical motion used in the previously described embodiments. The core support stand 212 comprises grid members 284 and pins 236 connected thereto substantially as shown in FIG. 1. The four fuel assembly posts 238', 238" rest on the base portion 240 of the four pins. Preferably, two proximate posts 238' each have a bracing springs 262 interposed between the post 238' and the adjacent pin 236'. This provides a horizontal bias on the opposite posts 238", so that the fuel assembly resists horizontal vibrations. The holddown action is provided by a pair of arms 244 rigidly connected to the actuating rod 230 which can be rotated between the unlocked 286 and the locked 290 positions of the stop posts 292, carried by the assembly end fitting 218. The grid 284 carries projections 294 having flanges 296 under which the arms 244 can be rotated. The actuator housing 200 has slits 202 therein which permit rotation of the arms 244 over sufficient angle to place the ends of the arms in either the locked 290 and the unlocked 286 positions under the flange 298. As an added means of stabilizing the assembly on the support, the stop posts 292 are preferably long enough to rest on the grid 284 when the posts 238 rest on the base 240.

In the upper portion of the fuel assembly 210 shown in FIG. 11, the actuating rod 230 has a nut 204 affixed to its upper end whereby the arms 244 may be rotated from above the assembly during the refueling operation. The springs 206 interposed between the control rod guide tube posts 274 and the holddown plate 272 provide a downward bias on the actuating rod 230 to maintain the arms 244 in the down most position so that the tool (not shown) for rotating the nut 204 need only provide a rotational force. An indicator 208 is preferably connected through the holddown plate 272 onto the actuating rod and rotatable therewith whereby the operator can visually determine whether the assembly is in the locked or unlocked position on the stand 212. Alternatively, the indicator 208 may act as a cam to rotate rod 230 as plate 272 is raised or lowered relative to extensions 274. The springs 206 holds plate 272 down so that rod 230 is rotationally positioned to cause locking of arms 244 under flange 296. The nut 204 is a manual override of the springs. The same unlocking action can be achieved by raising plate 272 by means of the refueling grapple (not shown).

Three embodiments of the invention have been disclosed, although it should be understood that other arrangements whereby the actuating rod is operable from above the assembly to lock and unlock the end fitting to the core support stand will fall within the scope of the invention.

What is claimed is:

1. A nuclear fuel assembly to be located below a core upper alignment plate and on a core support stand, the stand having projections thereon forming mating surfaces, comprising: a lower end fitting having an upper portion with an opening therethrough and a lower portion facing the support stand and including post means for placement adjacent to the projections; actuating means extending from the upper end of the assembly through the opening in the lower end fitting, and being movable relative thereto; and locking means carried by the lower end fitting adjacent to the post means and having a latch adapted to mate with the mating surface on the projections, the locking means being actuated by the movement of the actuating means, whereby the assembly may be selectively locked to the core support stand.

2. The assembly of claim 1 wherein: the end fitting has a square upper portion and four posts depending therefrom, each post to be located adjacent a respective projection; the locking means include first spring means associated with at least some of the posts and the respective projections, the first spring means having an external cammed side adapted to engage the mating surface on the projection and an internal side adapted to interact with the actuating means; and the actuating means include an actuating rod extending through the opening and rigid arms fixedly connected to the lower end of the rod below the upper portion of the end fitting, the arms extending horizontally whereby each arm is positioned above a respective internal side of each first spring means.

3. The assembly of claim 2 wherein said assembly further comprises bracing means including second spring means associated with some but not all of the posts, the second spring means having a greater stiffness than the first spring means and being actuable by the actuating means.

4. The assembly of claim 3 wherein the extension of the actuating rod upward through the assembly is long enough to permit the core alignment plate to bear down on the actuating rod when the core alignment plate is secured to the reactor vessel after the assemblies are placed in the reactor.

5. The assembly of claim 4 wherein the first and second spring means are located such that the arms come into contact with the springs means simultaneously.

6. The assembly of claim 5 wherein the posts adjacent to the first spring means have openings therein through which the latch on the external side of the first spring may be moved.

7. The assembly of claim 1 wherein: at least two of the posts have an opening therein at an elevation opposite the pin mating surface when the assembly is properly positioned on the stand; the actuating means includes an actuating rod extending through the opening and flexible arms rigidly attached to the lower end of the rod below the upper portion of the end fitting; and the locking means includes a latch rigidly connected to the outer ends of the arms, the latch being slidably disposed within the openings in the posts.

8. The assembly of claim 7 wherein the lower end fitting includes an actuator housing through which the actuating rod may be reciprocated, and bias means interposed between the housing and the actuating means for applying a downward force to the actuating means.

9. The assembly of claim 1 wherein: the actuating means includes an actuating rod extending through the opening; the locking means includes rigid arms rigidly connected to the lower end of the rod below the upper portion of the end fitting, the arms having a latch surface on the outer end for engaging the mating surface of the projection; and the post means have slits therein through which the arms extend toward the projections, the post means defining first and second stop surfaces corresponding to engagement and disengagement, respectively, of the latch on the mating surface of the adjacent projection.

* * * * *